United States Patent
Park et al.

(10) Patent No.: US 12,448,029 B2
(45) Date of Patent: Oct. 21, 2025

(54) STEERING CONTROL DEVICE, STEERING ASSIST DEVICE AND METHOD

(71) Applicant: HL Mando Corporation, Pyeongtaek-si (KR)

(72) Inventors: JiHoon Park, Seongnam-si (KR); Sun Hong Park, Yongin-si (KR); Hyun Chul Tae, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 939 days.

(21) Appl. No.: 17/586,987

(22) Filed: Jan. 28, 2022

(65) Prior Publication Data

US 2022/0234648 A1 Jul. 28, 2022

(30) Foreign Application Priority Data

Jan. 28, 2021 (KR) .................. 10-2021-0012004

(51) Int. Cl.
*B62D 5/04* (2006.01)

(52) U.S. Cl.
CPC .......... *B62D 5/0421* (2013.01); *B62D 5/0406* (2013.01); *B62D 5/0409* (2013.01)

(58) Field of Classification Search
CPC ... B62D 5/0421; B62D 5/0406; B62D 5/0409
See application file for complete search history.

(56) References Cited

U.S. PATENT DOCUMENTS

| | | | |
|---|---|---|---|
| 7,246,679 B2 * | 7/2007 | Kasahara | B62D 5/003 |
| | | | 180/443 |
| 11,084,526 B2 | 8/2021 | Yu et al. | |
| 2020/0277005 A1 | 9/2020 | Loussaut et al. | |
| 2022/0148342 A1 | 5/2022 | Fagergren et al. | |

FOREIGN PATENT DOCUMENTS

| | | | | |
|---|---|---|---|---|
| CN | 104108417 A | * | 10/2014 | .......... B62D 5/0472 |
| DE | 102019111415 A1 | * | 11/2019 | .......... B62D 15/022 |
| DE | 112018006236 T5 | | 9/2020 | |
| DE | 102019111415 B4 | | 6/2022 | |
| JP | 2004-155282 A | | 6/2004 | |

OTHER PUBLICATIONS

First Office Action issued Sep. 21, 2023 for counterpart German Patent Application No. 102022200887.1.

* cited by examiner

*Primary Examiner* — Jacob D Knutson
(74) *Attorney, Agent, or Firm* — Hauptman Ham, LLP

(57) ABSTRACT

The embodiments of the present disclosure relate to a steering control device, and a steering assist device and method. The steering control device may control an input-side steering motor included in a input-side steering actuator to assist an input-side mechanism connected to a steering wheel, and control an output-side steering motor included in a output-side steering actuator to assist an output-side mechanism mechanically separated from the input-side mechanism and connected to a wheel.

18 Claims, 14 Drawing Sheets

STEERING CONTROL DEVICE, STEERING ASSIST DEVICE AND METHOD

CROSS REFERENCE TO RELATED APPLICATION

This application claims priority from Korean Patent Application No. 10-2021-0012004, filed on Jan. 28, 2021, which is hereby incorporated by reference for all purposes as if fully set forth herein.

TECHNICAL FIELD

An embodiment of the present disclosure relates to a steering control device, and a steering assist device and method.

BACKGROUND

In general, a steering system refers to a system capable of changing a steering angle of a wheel based on a steering force (or rotational force) applied to a steering wheel by a driver of a vehicle. Recently, an electric power steering system (EPS) has been applied to a vehicle in order to reduce the steering force of the steering wheel to ensure the stability of the steering state.

Recently, there is a need for a systematic and accurate diagnosis method for a steering system of a vehicle.

SUMMARY

Embodiments of the present disclosure provide a steering control device capable of systematic and accurate diagnosis.

In addition, embodiments of the present disclosure provide a steering assist device capable of systematic and accurate diagnosis.

In addition, embodiments of the present disclosure provide a steering assist method capable of systematic and accurate diagnosis.

In an aspect of the present disclosure, the present embodiments may provide a steering control device, which controls an input-side steering motor included in a input-side steering actuator to assist an input-side mechanism connected to a steering wheel and controls an output-side steering motor included in a output-side steering actuator to assist an output-side mechanism mechanically separated from the input-side mechanism and connected to a wheel, including a determiner configuring to determine whether of performing a ground checking based on vehicle state information, and a diagnostic controller configuring to, if the determiner determines to perform the ground checking, analyze a response of the output-side steering actuator according to an input value of the output-side steering motor in a frequency domain, and compares an analysis result with preset normal data to diagnose a steering system.

In another aspect of the present disclosure, the present embodiments may provide a steering assist device including an input-side steering actuator for assisting an input-side mechanism connected to a steering wheel, an output-side steering actuator which is mechanically separated from the input-side mechanism and assists an output-side mechanism connected to a wheel, an input-side steering controller for controlling an input-side steering motor included in the input-side steering actuator, and an output-side steering controller for controlling an output-side steering motor included in the output-side steering actuator, wherein the input-side steering controller configuring to determine whether of performing a ground checking based on vehicle state information, and determines an input value of the output-side steering motor based on the determination, and wherein, if the input-side steering controller determines to perform the ground checking, the output-side steering controller configuring to analyze a response of the output-side steering actuator according to an input value of the output-side steering motor in a frequency domain, and compares an analysis result with preset normal data to diagnose a steering system.

In another aspect of the present disclosure, the present embodiments may provide a steering assist method for controlling an input-side steering motor included in a input-side steering actuator to assist an input-side mechanism connected to a steering wheel and controlling an output-side steering motor included in a output-side steering actuator to assist an output-side mechanism mechanically separated from the input-side mechanism and connected to a wheel, including determining whether of performing a ground checking based on vehicle state information, and diagnosing a steering system, in the case of determining to perform the ground checking, by analyzing a response of the output-side steering actuator according to an input value of the output-side steering motor in a frequency domain, and comparing an analysis result with preset normal data.

According to embodiments of the present disclosure, it is possible to provide a steering control device capable of systematic and accurate diagnosis.

In addition, according to embodiments of the present disclosure, it is possible to provide a steering assist device capable of systematic and accurate diagnosis.

In addition, according to embodiments of the present disclosure, it is possible to provide a steering assist method capable of systematic and accurate diagnosis.

DETAILED DESCRIPTION

Figure 1:
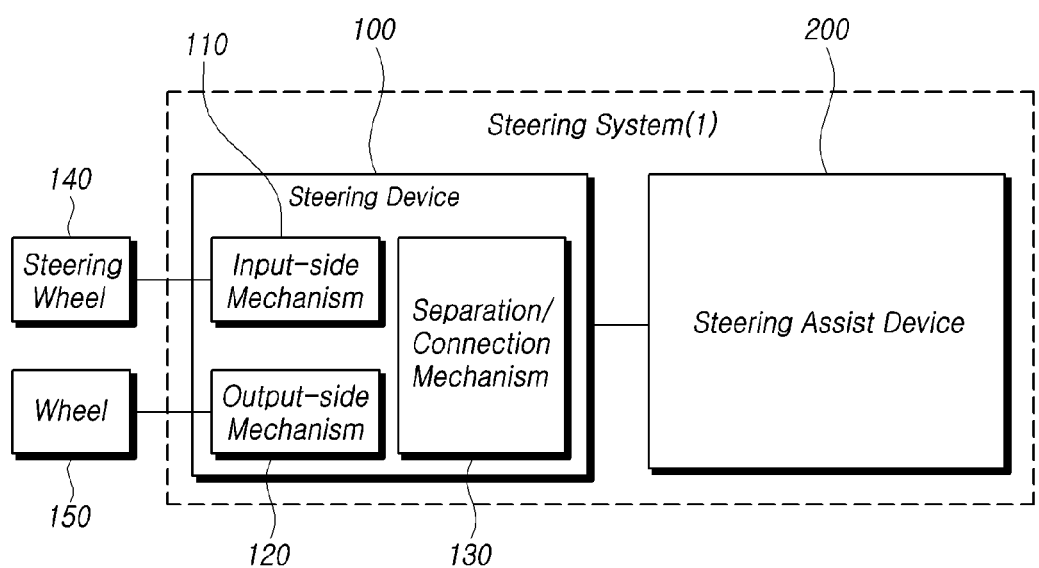
FIG. 1 is a schematic block diagram for explaining a steering system according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Those of ordinary skill in the art pertaining to the present embodiments may understand that the term "position" described below can be used instead of other terms having the same meaning, such as location, displacement, movement, angle, etc.

FIG. 1 is a schematic block diagram for explaining a steering system according to the present embodiments.

Referring to FIG. 1, a steering system 1 according to the present exemplary embodiments may include at least one of the steering device 100 and the steering assist device 200.

The steering device 100 may change a steering angle of a wheel 150 based on a steering force (or rotational force, etc.) applied to a steering wheel 140. The steering device 100 may include at least one of an input-side mechanism 110, an output-side mechanism 120, and a separation/connection mechanism 130.

The input-side mechanism 110 may be one or plural. The input-side mechanism 110 may be connected to the steering wheel 140. The input-side mechanism 110 may rotate in a rotational direction of the steering wheel 140 or in a direction opposite to the rotational direction of the steering wheel 140. The input-side mechanism 110 may include a steering shaft connected to the steering wheel 140, however, is not limited thereto, and may include any mechanism (or device) as long as it is capable of rotating (or moving) in the direction of rotation of the steering wheel or in a direction opposite to the direction of rotation of the steering wheel.

The output-side mechanism 120 may be one or plural. The output-side device 120 may be connected to the input-side device 110 by at least one of electrical and mechanical manner. The output-side mechanism 120 may be connected to the wheel 150 to change the steering angle (or movement, etc.) of the wheel 150. The output-side mechanism 120 may include at least one of a pinion, a rack, a tie rod, and a knuckle arm, but is not limited thereto, and may include any mechanism (or device) as long as it is a mechanism (or device) capable of changing the steering angle (or movement, etc.) of a wheel.

The separation/connection mechanism 130 may be one or plural. The separation/connection mechanism 130 may be connected to the input-side mechanism 110 and the output-side mechanism 120. The separation/connection mechanism 130 may mechanically and/or electrically connect and/or disconnect the input-side mechanism 110 and the output-side mechanism 120. The separation/connection mechanism 130 may include, but is not limited to, a clutch, and may include any mechanism (or device) as long as it is a mechanism (or device) capable of mechanically or electrically connecting and/or disconnecting the input-side mechanism and the output-side mechanism.

The steering device 100 according to the present embodiments may include at least one steering device of a steering device in which an input-side mechanism and an output-side mechanism are mechanically connected, a steering device (e.g., steer-by-wire, SbW) in which the input-side mechanism and the output-side mechanism are electrically connected; and a steering device (e.g., SbW including a clutch) in which the input-side mechanism and the output-side mechanism are connected to the separation/connection mechanism.

Meanwhile, the steering wheel 140 and the wheel 150 may be one or plural, respectively. The steering wheel 140 and the wheel 150 may be separately provided as shown in the drawings, but are not limited thereto, and may be included in the steering device 100.

The steering assist device 200 may be connected to the steering device 100. The steering assist device 200 may assist the steering device 100.

Figure 2:
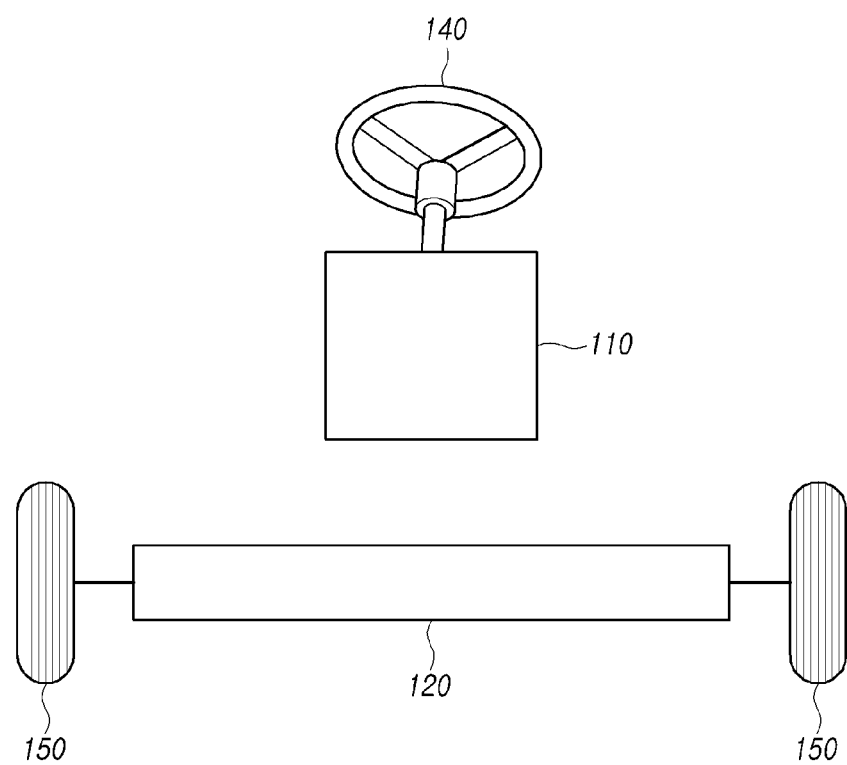
FIG. 2 is a diagram for explaining a steering device according to the present embodiments.

FIG. 2 is a diagram for explaining a steering device according to the present embodiments.

Referring to FIG. 2, the steering device 100 according to the present embodiments may include an input-side mechanism 110 connected to a steering wheel 140, and an output-side mechanism 120 mechanically separated from the input-side mechanism 110 and connected to a wheel 150. That is, the steering device 100 according to the present embodiments may be a steer-by-wire (SbW) steering device.

Here, the input-side mechanism 110 may rotate in the direction of rotation of the steering wheel 140 or in a direction opposite to the rotation direction of the steering wheel 140, and may include a steering shaft connected to the steering wheel 140, etc. The output-side mechanism 120, which is mechanically separated from the input-side mechanism 110 and connected electronically, may be connected to the wheel 150 and may change the steering angle (or movement, etc.) of the wheel, and may include at least one of a pinion, a rack, a tie rod and a knuckle arm.

Figure 3:
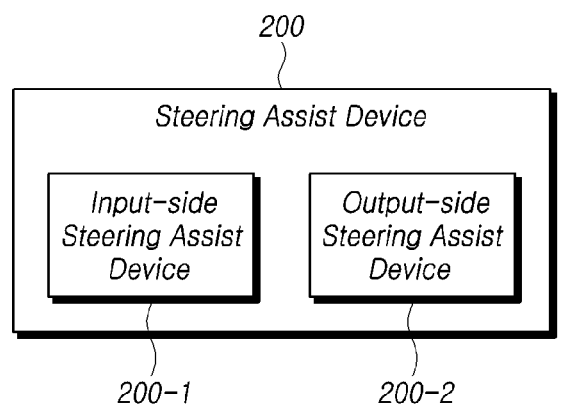
FIG. 3 is a diagram for explaining a steering assist device according to the present embodiments.

FIG. 3 is a diagram for explaining a steering assist device according to the present embodiments.

Referring to FIG. 3, a steering assist device 200 according to the present exemplary embodiment may include at least one assist device among an input-side steering assist device 200-1 and an output-side steering assist device 200-2. The input-side steering assist device 200-1 and the output-side steering assist device 200-2 may be connected by at least one of electrical, magnetic and mechanical manner.

The input-side steering assist device 200-1 may be connected to the input-side mechanism by at least one of electrical, magnetic, and mechanical manner. The input-side steering assist device 200-1 may assist an input-side mechanism.

The output-side steering assist device 200-2 may be connected to the output-side mechanism by at least one of electrical, magnetic and mechanical manner. The output-side steering assist device 200-2 may assist the input-side mechanism.

Figure 4:
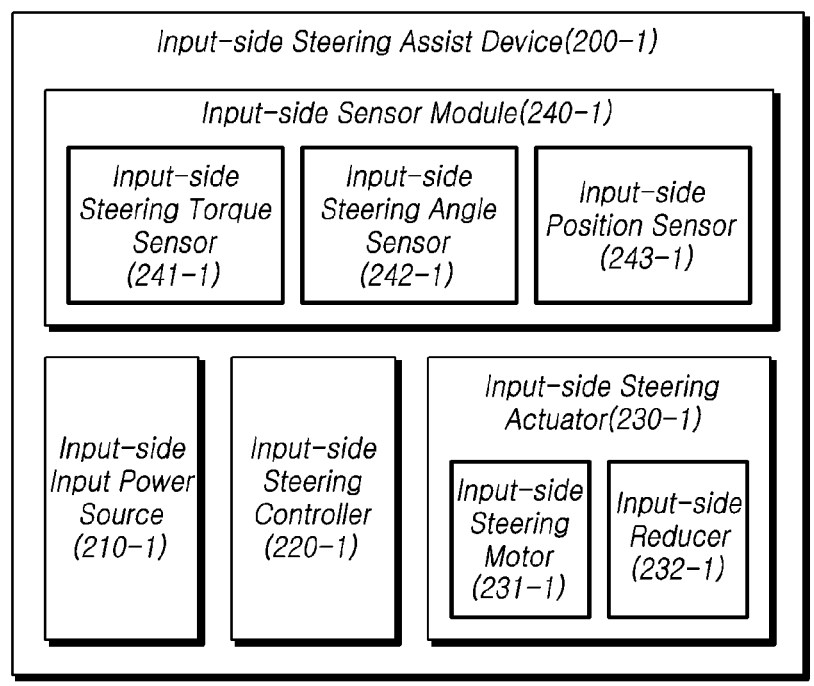
FIG. 4 is a diagram for explaining the input-side steering assist device according to the present embodiments.

FIG. 4 is a diagram for explaining the input-side steering assist device according to the present embodiments.

Referring to FIG. 4, the input-side steering assist device 200-1 according to the present embodiments may include at least one of an input-side input power source 210-1, an input-side steering controller 220-1, an input-side steering actuator 230-1, and an input-side sensor module 240-1.

There may be one or a plurality of input-side input power sources 210-1. The input-side input power source 210-1 may include at least one of a DC power source and an AC power source. In particular, the DC power source may include a battery or the like, but is not limited thereto, and may include any power source capable of providing DC power.

The input-side sensor module 240-1 may include at least one sensor. Here, the sensor may include at least one of an input-side steering torque sensor 241-1, an input-side steering angle sensor 242-1, and an input-side position sensor 243-1, but is not limited thereto, and may include any sensor as long as it is a sensor capable of measuring the state of a vehicle and the steering state of the vehicle.

There may be provided one or a plurality of input-side steering torque sensors 241-1. The input-side steering torque sensor 241-1 may detect a steering torque of the steering wheel to obtain torque information of the steering wheel, and may provide torque information of the steering wheel to the input-side steering controller 220-1. In addition, the input-side steering angle sensor 242-1 may be one or plural. The input-side steering angle sensor 242-1 may measure the steering angle of the steering wheel to obtain steering angle information of the steering wheel, and may provide the steering angle information of the steering wheel to the input-side steering controller 220-1. In addition, the input-side position sensor 243-1 may be one or plural. The input-side position sensor 243-1 may measure at least one position among the position of the input-side mechanism and the position of the input-side steering motor to obtain position information of at least one of the position information of the input-side mechanism and the position information of the input-side steering motor, and may provide the input-side steering controller 220-1 with position information of at least one of the position information of the input-side mechanism and the position information of the input-side steering motor. Here, the input-side position sensor 243-1 may include a displacement sensor capable of measuring the position of the input-side mechanism, and may include a motor position sensor capable of measuring the position of the input-side steering motor.

There may be one or a plurality of input-side steering controllers 220-1. The input-side steering controller 220-1 may be connected to the input-side input power source 210-1. The input-side steering controller 220-1 may receive electrical energy from the input-side input power source 210-1 and filter noise of the electrical energy.

The input-side steering controller 220-1 may generate a steering motor control signal based on information (e.g., at least one of steering torque information, steering angle information, position information, and vehicle speed information, etc.).

The input-side steering controller 220-1 may convert filtered electrical energy according to the steering motor control signal to generate an assist steering force, and control the input-side steering actuator 230-1 (or the input-side steering motor 231-1) based on the assist steering force.

There may be one or a plurality of input-side steering actuators 230-1. The input-side steering actuator 230-1 may be connected to the input-side steering controller 220-1. The input-side steering actuator 230-1 may provide an assist force (e.g., a reaction force, etc.) in steering of the steering device 100 by operating based on the assist steering force provided from the input-side steering controller 220-1.

The input-side steering actuator 230-1 may include at least one of an input-side steering motor 231-1 and an input-side reducer 232-1. Each of the input-side steering motor 231-1 and the input-side reducer 232-1 may be one or plural. At least one of the input-side steering motor 231-1 and the input-side reducer 232-1 may be connected to the input-side steering controller 220-1.

In the case that the input-side steering actuator 230-1 includes the input-side steering motor 231-1, the input-side steering motor 231-1 may assist the steering of the steering device 100 by operating based on the assist steering force provided from the input-side steering controller 220-1.

In the case that the input-side steering actuator 230-1 includes the input-side steering motor 231-1 and the input-side reducer 232-1, the input-side steering motor 231-1 may operate based on the assist steering force provided from the input-side steering controller 220-1, and the input-side reducer 232-1 may operate according to the operation of the input-side steering motor 231-1 to assist the steering of the steering device 100.

Figure 5:
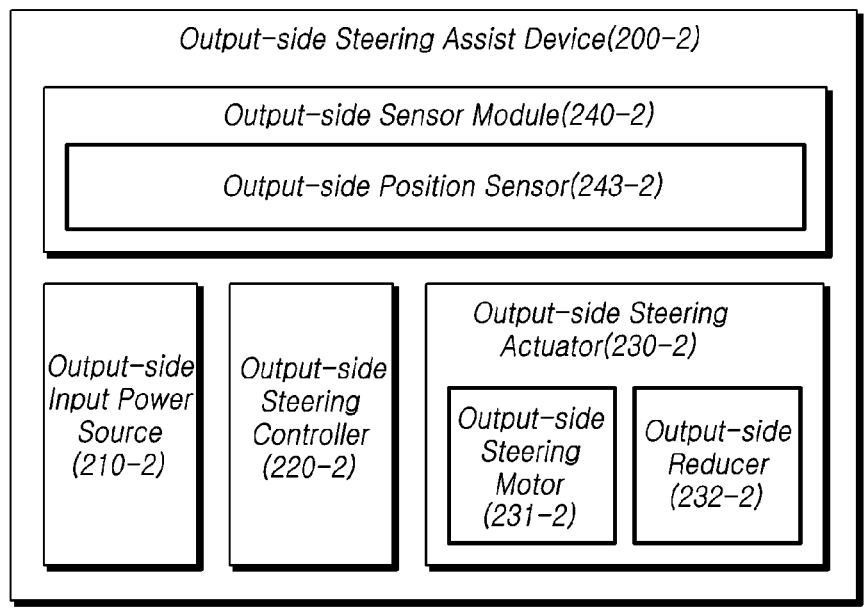
FIG. 5 is a diagram for explaining an output-side steering assist device according to the present embodiments.

FIG. 5 is a diagram for explaining an output-side steering assist device according to the present embodiments.

Referring to FIG. 5, an output-side steering assist device 200-2 according to the present embodiments may include at least one of an output-side input power source 210-2, an output-side steering controller 220-2, an output-side steering actuator 230-2, and an output-side sensor module 240-2.

The output-side input power source 210-2 may be one or plural. The output-side input power source 210-2 may include at least one of a DC power source and an AC power source. In particular, the DC power source may include a battery or the like, but is not limited thereto, and may include any power source capable of providing DC power.

The output-side sensor module 240-2 may include at least one sensor. Here, the sensor may include a output-side position sensor 243-2, but is not limited thereto, and may include any sensor capable of measuring the state of the vehicle and the steering state of the vehicle.

There may be one or a plurality of output-side position sensors 243-2. The output-side position sensor 243-2 may measure at least one position among a position of the output-side mechanism and a position of the output-side steering motor to obtain position information of at least one of the position information of the output-side mechanism and the position information of the output-side steering motor, and may provide the output-side steering controller 220-2 with position information of at least one of the position information of the output-side mechanism and the position information of the output-side steering motor. Here, the output-side position sensor 243-2 may include a displacement sensor (e.g., a rack displacement sensor or a rack position sensor) capable of measuring the position of the output-side mechanism.

There may be one or a plurality of output-side steering controllers 220-2. The output-side steering controller 220-2 may be connected to the output-side input power source 210-2. The output-side steering controller 220-2 may receive electrical energy from the output-side input power source 210-2 and filter noise of the electrical energy.

The output-side steering controller 220-2 may generate a steering motor control signal based on information (for example, at least one of steering torque information, steering angle information, position information, and vehicle speed information, etc.).

The output-side steering controller 220-2 may convert the filtered electrical energy according to the steering motor control signal to generate an assist steering force, and may control the output-side steering actuator 230-2 (or the output-side steering motor 231-2) based on the assist steering force.

There may be one or a plurality of output-side steering actuators 230-2. The output-side steering actuator 230-2 may be connected to the output-side steering controller 220-2. The output-side steering actuator 230-2 may assist the steering of the steering device 100 (e.g., provision of steering assistance force, etc.) by operating based on the assist steering force provided from the output-side steering controller 220-2.

The output-side steering actuator 230-2 may include at least one of an output-side steering motor 231-2 and an output-side reducer 232-2. Each of the output-side steering motor 231-2 and the output-side reducer 232-2 may be one or plural. At least one of the output-side steering motor 231-2 and the output-side reducer 232-2 may be connected to the output-side steering controller 220-2.

In the case that the output-side steering actuator 230-2 includes the output-side steering motor 231-2, the output-side steering motor 231-2 may assist the steering of the steering device 100 by operating based on the assist steering force provided from the output-side steering controller 220-2.

In the case that the output-side steering actuator 230-2 includes the output-side steering motor 231-2 and the output-side reducer 232-2, the output-side steering motor 231-2 may operates based on the assist steering force provided from the output-side steering controller 220-2, and the output-side reducer 232-2 may operate according to the operation of the output-side steering motor 231-2 to assist the steering of the steering device 100.

Referring to FIGS. 4 and 5, the input-side input power source 210-1 and the output-side input power source 210-2 may be different power sources as shown in the drawings, but the present invention is not limited thereto, and they may be the same power source.

In addition, the input-side steering motor 231-1 and/or the output-side steering motor 231-2 may include at least one of a single winding type steering motor and a dual winding type steering motor, but is not limited thereto, and may include any motor, as long as it is capable of assisting the steering of the steering device.

The input-side steering motor 231-1 and/or the output-side steering motor 231-2 may include at least one of a three-phase type motor and a five-phase type motor, but is not limited thereto, and may include any motor, as long as it is capable of assisting the steering of the steering device.

Figure 6:
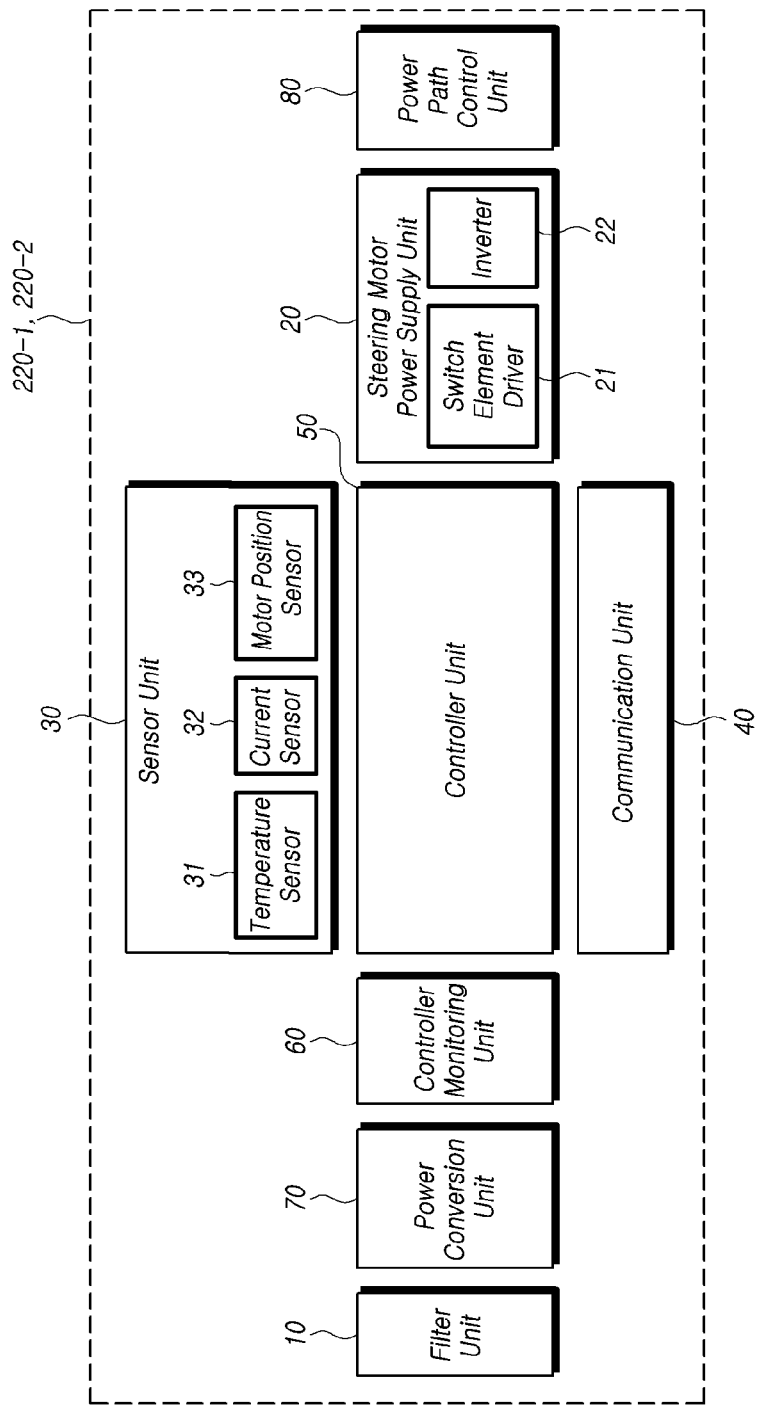
FIG. 6 is a diagram for explaining an input-side steering controller and an output-side steering controller according to the present embodiments.

FIG. 6 is a diagram for explaining an input-side steering controller and an output-side steering controller according to the present embodiments.

Referring to FIG. 6, each of the input-side steering controller 220-1 and the output-side steering controller 220-2 may include at least one of a filter unit 10, a steering motor power supply unit 20, a sensor unit 30, a communication unit 40, a controller unit 50, and a controller monitoring unit 60, the operation power conversion unit 70, and the power path control unit 80.

There may be one or a plurality of filter units 10. The filter unit 10 may be connected to input power source. The filter unit 10 may filter noise of electrical energy provided from the input power source, and provide the noise-filtered electrical energy to the steering motor power supply unit 20 and the operation power conversion unit 70.

The steering motor power supply unit 20 may be one or plural. The steering motor power supply unit 20 may be connected to the filter unit 10 and receive filtered electrical energy. The steering motor power supply unit 20 may be connected to the controller unit 50 to receive a steering motor control signal. The steering motor power supply unit 20 may convert the filtered electric energy based on the steering motor control signal to generate an assist steering force, and may control the steering motor based on the assist steering force.

The steering motor power supply unit 20 may include at least one of a switch element driver 21 and an inverter 22. Each of the switch element driver 21 and the inverter 22 may be one or plural.

The switch element driver 21 may receive a steering motor control signal from the controller unit 50, generate a switch element control signal based thereon, and provide the switch element control signal to the inverter 22. The inverter 22 may generate an assist steering force by converting the filtered electric energy of the filter unit according to the switch element control signal.

The inverter 22 may include a switch and/or a transistor, but is not limited thereto, and may include any device, as long as it is a device capable of generating an assist steering force by converting electrical energy according to a switch element control signal.

Here, if the inverter 22 includes a field effect transistor (FET), the switch element driver 21 may be a gate driver. Accordingly, the gate driver may receive the steering motor control signal from the controller unit 50, generate a gate control signal based thereon, and provide the gate control signal to the inverter 22. The inverter 22 may generate the assist steering force by converting the filtered electric energy of the filter unit according to the gate control signal.

There may be one or a plurality of power path control units 80. The power path control unit 80 may be located between the steering motor power supply unit 20 (or the inverter 22) and the steering actuator 230 (or the steering motor 231), and may supply or block the assist steering force provided from the steering motor power supply unit 20 (or the inverter 22) to the steering actuator 230 (or the steering motor 231).

The power path control unit 80 may include at least one phase disconnector (PCO). A phase disconnector is a device or circuit capable of cutting off a phase, and may include at least one of a switch, a circuit breaker, a disconnector, a switch and a transistor, but is not limited thereto, and may include any element and/or circuitry, so long as it is capable of cutting off a phase.

The sensor unit 30 may include at least one of a temperature sensor 31, a current sensor 32, and a motor position sensor 33, but is not limited thereto, and may include any sensor capable of measuring a state of the steering system (or steering controller). The temperature sensor 31, the current sensor 32, and the motor position sensor 33 may be one or plural, respectively.

The temperature sensor 31 may measure the temperature of the steering controller 220 to obtain temperature information and provide the temperature information to the controller unit 50. In addition, the current sensor 32 measures the assist current (or assist steering force) provided from the steering motor power supply unit 20 to the steering actuator 230 (or the steering motor 231) to obtain assist current information, and may provide the assist current information to the controller unit 50. In addition, the motor position sensor 33 may measure the position of the steering motor to obtain position information of the steering motor, and may provide the position information of the steering motor to the controller unit 50. As described above, the motor position sensor 33 may be included in the steering controller 220, but is not limited thereto, and may be provided separately.

The communication unit 40 may be one or plural. The communication unit 40 may include at least one of an internal communication unit and an external communication unit. In the case that there are a plurality of steering controllers, the internal communication unit may be connected to another steering controller to receive or provide information to each other. The external communication unit may be connected to the vehicle to receive vehicle state information (e.g., vehicle speed information, etc.) from the vehicle or provide information related to a steering system to the vehicle.

There may be one or a plurality of controller units 50. The controller unit 50 may be connected to each component of the steering controller 220 to provide or receive information, and may control the operation of each component of the steering controller 220 based on the information.

For example, the controller unit 50 may generate a steering motor control signal based on at least one information of torque information of the steering wheel, steering angle information of the steering wheel, temperature information, assist current information, position information (position information of the input-side mechanism, position information of the output-side mechanism, position information of the steering motor, etc.), vehicle state information (for example, vehicle speed information), input power state information, short circuit (or overcurrent) state information, current detection information of the filter unit, and steering motor state information. The controller unit 50 may provide the steering motor control signal to the steering motor power supply unit 20 (or the switch element driver 21), or may generate a separation/connection control signal (e.g., a clutch control signal) to provide to the separation/connection mechanism.

The controller unit 50 may include a microcontroller, but is not limited thereto, and may include any device (or computer) capable of processing (or executing and calculating) a program.

The controller monitoring unit 60 may be connected to the controller unit 50. The controller monitoring unit 60 may monitor the operating state of the controller unit 50. For example, the controller unit 50 may provide a watchdog signal to the controller monitoring unit 60. In addition, the controller monitoring unit 60 may be cleared based on the watchdog signal provided from the controller unit 50, or may generate a reset signal to provide to the controller unit 50.

The controller monitoring unit 60 may include a watchdog, but is not limited thereto, and may include any device as long as it is capable of monitoring the controller unit. In particular, the watchdog may include a window watchdog having a deadline, that is, a start and an end.

The operation power conversion unit 70 may be connected to the filter unit 10. The operation power conversion unit 70 may convert the filtered electric energy of the filter unit 10 to generate operating voltages for each component of the steering controller 220. The operation power conversion unit 70 may include at least one of a DC-DC converter and a regulator, but is not limited thereto, and may include any device a device capable of converting filtered electrical energy to generate an operating voltage for each component of the steering controller and/or the exterior of the steering controller.

Meanwhile, the steering controller 220 may include an electronic control unit (ECU), but is not limited thereto, and may include any electronically controllable control device (or system).

Figure 7:
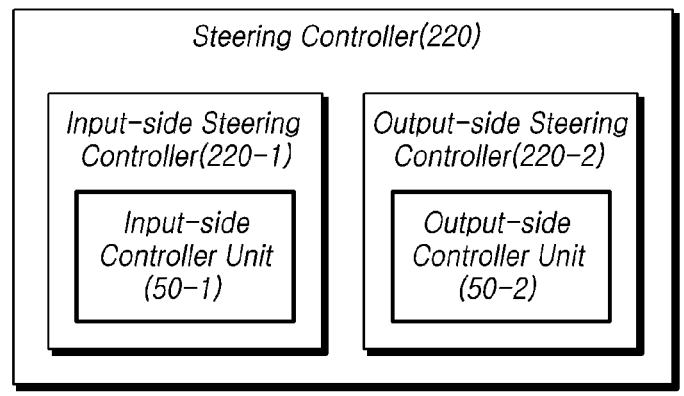
FIGS. 7 and 8 are diagrams for explaining a steering controller according to the present embodiments.
Figure 8:
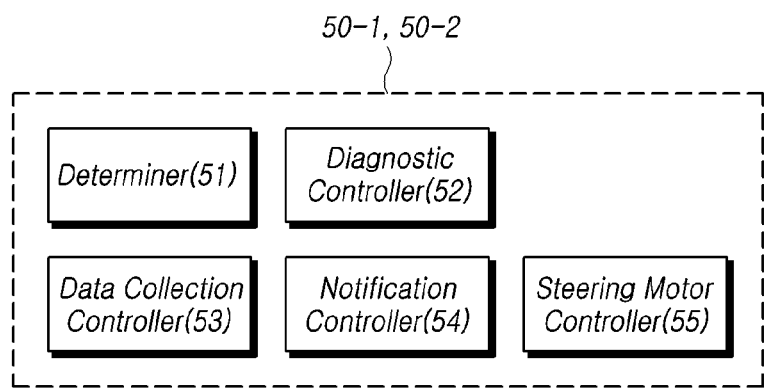

FIGS. 7 and 8 are diagrams for explaining a steering controller according to the present embodiments.

Referring to FIG. 7, the steering controller 220 according to the present embodiments may include at least one of an input-side steering controller 220-1 and an output-side steering controller 220-2. The input-side steering controller 220-1 and the output-side steering controller 220-2 may be connected by at least one of electrical, magnetic, and mechanical manner.

Here, the input-side steering controller 220-1 may include an input-side controller unit 50-1, and the output-side steering controller 220-2 may include an output-side controller unit 50-2.

Referring to FIG. 8, each of the input-side controller unit 50-1 and the output-side controller unit 50-2 according to the present embodiments may include at least one of a determiner 51, a diagnostic controller 52, a data collection controller 53, a notification controller 54, and a steering motor controller 55. The determiner 51, the diagnostic controller 52, the data collection controller 53, the notification controller 54, and the steering motor controller 55 may be connected by at least one of electrical, magnetic, and mechanical manner.

Referring to FIGS. 1 to 8, the steering controller according to the present embodiments may be referred to as a steering control device.

Accordingly, a steering control device according to the present exemplary embodiments may include at least one of a determiner 51, a diagnostic controller 52, a data collection controller 53, a notification controller 54, and a steering motor controller 55. The determiner 51, the diagnostic controller 52, the data collection controller 53, the notification controller 54, and the steering motor controller 55 may be connected to each other by at least one of electrical, magnetic, and mechanical manner.

The steering control device according to the present embodiments may control an input-side steering motor included in a input-side steering actuator to assist an input-side mechanism connected to a steering wheel, and may control an output-side steering motor included in a output-side steering actuator to assist an output-side mechanism mechanically separated from the input-side mechanism and connected to a wheel. The steering control device may include the determiner 51 for determining whether of performing a ground checking based on vehicle state information, and the diagnostic controller 52 for, if the determiner determines to perform the ground checking, analyzing a response of the output-side steering actuator according to an input value of the output-side steering motor in a frequency domain, and comparing an analysis result with preset normal data to diagnose a steering system.

According to embodiments, the determiner 51 may determine whether to perform ground checking based on vehicle state information.

Here, the vehicle state information may include at least one of vehicle operation state information, vehicle interior state information, and vehicle driving state information, but is not limited thereto, and may include any information indicating the state of the vehicle.

In particular, the vehicle operation state information may include vehicle ignition information, but is not limited thereto, and may include any information indicating the operating state of the vehicle.

In addition, the vehicle interior state information may include vehicle interior object information, but is not limited thereto, and may include any information indicating the internal state of the vehicle.

In addition, the vehicle driving state information may include at least one of vehicle driving time information and vehicle driving distance information, but is not limited thereto, and may include any information indicating the driving state of the vehicle.

For example, the determiner 51 may determine whether of performing the ground checking by determining an ON state or an OFF state of a vehicle ignition based on the vehicle ignition information, determining a presence of a person inside a vehicle based on the vehicle interior object information, determining a state in which a vehicle driving time exceeds a specific time based on vehicle driving time information, and determining a state in which a vehicle driving distance exceeds a specific distance based on the vehicle driving distance information.

In addition, as an example, the determiner 51 may determine to perform the ground checking, when the vehicle ignition is OFF and there is no person inside the vehicle, in the case of at least one of the state in which the vehicle driving time exceeds the specific time and the state in which the vehicle driving distance exceeds the specific distance.

In addition, the determiner 51 may determine not to perform the ground checking in at least one of a state in which the vehicle ignition is ON, a state in which there is a person inside the vehicle, a state in which the vehicle driving time is less than or equal to the specific time, and a state in which the vehicle driving distance is less than or equal to the specific distance.

In the case that the determiner 51 determines to perform the ground checking, the diagnostic controller 52 may analyze a response of the output-side steering actuator according to an input value of the output-side steering motor in a frequency domain, and may compare an analysis result with preset normal data to diagnose a steering system.

Here, the preset normal data is reference data for diagnosing the steering system, and may be collected and accumulated while driving the vehicle, or received and collected from the same vehicle by using over-the-air (OTA).

For example, the diagnostic controller 52 may compare preset normal data with at least one of a gain margin and a phase margin analyzed through a transfer function based on an output value of the output-side steering motor according to a sine input value of the output-side steering motor, and may diagnose the steering system according to a comparison result.

That is, the diagnostic controller 52 may compare the gain margin with a normal gain margin of preset normal data, and compare the phase margin with a normal phase margin of preset normal data.

In addition, the diagnostic controller 52 may diagnose that the steering system is in an abnormal state in the case of at least one of a case in which the gain margin exceeds the normal gain margin of preset normal data and a case in which the phase margin exceeds the normal phase margin of preset normal data.

In addition, the diagnostic controller 52 may diagnose that the steering system is in a normal state if the gain margin is less than or equal to the normal gain margin of the preset normal data and the phase margin is less than or equal to the normal phase margin of the preset normal data.

As another example, the diagnostic controller 52 may compare at least one of an amplitude and a frequency of a signal measured by an accelerometer or a vibration sensor with preset normal data when the output-side steering actuator is driven based on a sine input value of the output-side steering motor, and may diagnose the steering system according to a comparison result.

That is, the diagnostic controller 52 may compare the amplitude with a normal amplitude of preset normal data, and compare the frequency with a normal frequency of preset normal data.

In addition, the diagnostic controller 52 may diagnose that the steering system is in an abnormal state in the case of at least one of a case in which the amplitude exceeds the normal amplitude of preset normal data and a case in which the frequency exceeds the normal frequency of preset normal data.

Meanwhile, the diagnostic controller 52 may diagnose that the steering system is in a normal state if the amplitude is less than or equal to the normal amplitude of the preset normal data and the frequency is less than or equal to the normal frequency of the preset normal data.

According to another embodiment, the determiner 51 may determine whether of system initiation based on the vehicle state information.

Here, the vehicle state information may include vehicle operation state information, but is not limited thereto, and may include any information indicating the state of the vehicle.

In particular, the vehicle operation state information may include at least one of vehicle ignition information, vehicle speed information, and ground checking information, but is not limited thereto, and may include any information indicating the operation state of the vehicle.

For example, the determiner 51 may determine whether of system initiation by determining an ON state or an OFF state of a vehicle ignition based on the vehicle ignition information, determining a vehicle stop state based on the vehicle speed information, and determining a ground checking state based on the ground checking information.

In addition, the determiner 51 may determine to initiate the system if the vehicle ignition is in the ON state, a vehicle is in the vehicle stop state, and the ground checking is completed.

In addition, the determiner 51 may determine not to initiate the system in the case of at least one of a state in which the vehicle ignition is ON, a state in which a vehicle is not in the vehicle stop state, and a state in which the ground checking is not completed.

According to another embodiment, the determiner 51 may determine whether of performing a synchronization checking based on vehicle state information.

Here, the vehicle state information may include vehicle operation state information, but is not limited thereto, and may include any information indicating the state of the vehicle.

In particular, the vehicle operation state information may include vehicle driver's seat door information and system initiation information, but is not limited thereto, and may include any information indicating the operation state of the vehicle.

For example, the determiner 51 may determine whether of performing a synchronization checking by determining a driver's seat door open signal generation state of a vehicle based on the vehicle driver's seat door information, and determining a system initiation state based on the system initiation information.

In addition, the determiner 51 may determine to perform the synchronization checking if the driver's seat door open signal is generated and a system is in the system initiation state.

In addition, the determiner 51 may determine not to perform the synchronization checking in the case of at least one of a state in which the driver's seat door open signal is not generated, and a state in which a system is not initiated.

If the determiner 51 determines to perform the synchronization checking, the diagnostic controller 52 may diagnose an alignment state of the steering wheel and the output-side mechanism based on steering angle information of the steering wheel and displacement information of the output-side mechanism in a state where the steering wheel is assisted not to move.

For example, the diagnostic controller 52 may diagnose an alignment state of the steering wheel and the output-side mechanism by determining the position of the steering wheel based on the steering angle information of the steering wheel, and determining the position of the output-side mechanism based on the displacement information of the output-side mechanism.

For example, the diagnostic controller 52 may diagnose that the alignment state of the steering wheel and the output-side mechanism is in a normal state if a position of the steering wheel and a position of the output-side mechanism are in the same position.

Meanwhile, the diagnostic controller 52 may diagnose that the alignment state of the steering wheel and the output-side mechanism is abnormal if a position of the steering wheel and a position of the output-side mechanism are not in the same position.

According to another embodiment, the determiner 51 may determine whether to initiate a steering assist based on vehicle state information.

Here, the vehicle state information may include vehicle operation state information, but is not limited thereto, and may include any information indicating the state of the vehicle.

In particular, the vehicle operation state information may include vehicle ignition information, synchronization checking information and fault information, but is not limited thereto, and may include any information indicating the operation state of the vehicle.

For example, the determiner 51 may determine whether to initiate a steering assist by determining an ON state or an OFF state of a vehicle ignition based on vehicle ignition information, determining a synchronization checking state based on synchronization checking information, and determining a fault state of the steering system based on fault information.

The determiner 51 may determine to initiate the steering assist if the vehicle ignition is in the ON state, a synchronization is completed, and the steering system is not in the fault state.

Meanwhile, determiner 51 may determine not to initiate the steering assist in the case of at least one of a state in which the vehicle ignition is in the OFF state, a state in which a synchronization is not completed, and a state in which the steering system is in the fault state.

The data collection controller 53 may collect and accumulate normal data, which is reference data for diagnosing the steering system, while the vehicle is driving. Alternatively, data collection controller may receive, collect and accumulate the normal data from the same vehicle by utilizing over-the-air (OTA).

In one or more cases among a case in which the diagnostic controller 52 diagnoses that the steering system is in an abnormal state, a case in which the determiner 51 determines not to initiate the system, a case in which the diagnostic controller 52 diagnoses that the alignment of the steering wheel and the output-side mechanism is in an abnormal state, and a case in which the determiner 51 determines not to initiate the steering assist, the notification controller 54 may be controlled to generate a notification.

The steering motor controller 55 may control at least one of an input-side steering motor and an output-side steering motor. Specifically, the steering motor controller 55 may generate a steering motor control signal and control the steering motor power supply unit based on the steering motor control signal to control at least one of the input-side steering motor and the output-side steering motor.

In an example, if the determiner 51 determines to perform ground checking, the steering motor controller 55 may control the operation of the output-side steering motor based on an input value of the output-side steering motor.

In another example, if the determiner 51 determines to perform the synchronization checking, the steering motor controller 55 may control the operation of the input-side steering motor so that the steering wheel does not move.

In another example, if the diagnostic controller 52 diagnoses that the alignment of the steering wheel and the output-side mechanism is in the abnormal state, the steering motor controller 55 may control the operation of the output-side steering motor so that the position of the output-side mechanism coincides with the position of the steering wheel.

In another example, if the determiner 51 determines to initiate the steering assist, the steering motor controller 55 may control the operation of at least one of the input-side steering motor and the output-side steering motor so that at least one of the input-side mechanism and the output-side mechanism is assisted.

Meanwhile, each of the input-side steering controller 50-1 and the output-side steering controller 50-2 according to the present embodiments may perform all of the functions of the determiner 51, the diagnostic controller 52, the data collection controller 53, the notification controller 54, and the steering motor controller 55 of the steering control device, but is limited thereto, may divide and perform such functions.

For example, the steering control device according to the present embodiments may include an input-side steering controller 220-1 for controlling an input-side steering motor included in a input-side steering actuator to assist an input-side mechanism connected to a steering wheel, and an output-side steering controller 220-2 for controlling an output-side steering motor included in a output-side steering actuator to assist an output-side mechanism mechanically separated from the input-side mechanism and connected to a wheel. The input-side steering controller 220-1 may determine whether of performing a ground checking based on vehicle state information, and determines an input value of the output-side steering motor based on the determination. If the input-side steering controller determines to perform the ground checking, the output-side steering controller 220-2 may analyze a response of the output-side steering actuator according to an input value of the output-side steering motor in a frequency domain, and compare an analysis result with preset normal data to diagnose a steering system.

In addition, the steering assist device 200 according to the present embodiments may include an input-side steering actuator 230-1 for assisting an input-side mechanism connected to a steering wheel, an output-side steering actuator 230-2 which is mechanically separated from the input-side mechanism and assists an output-side mechanism connected to a wheel, an input-side steering controller 220-1 for controlling an input-side steering motor included in the input-side steering actuator, and an output-side steering controller 220-2 for controlling an output-side steering motor included in the output-side steering actuator. The input-side steering controller 220-1 may determine whether of performing a ground checking based on vehicle state information, and determine an input value of the output-side steering motor based on the determination. In addition, if the input-side steering controller determines to perform the ground checking, the output-side steering controller 220-2 may analyze a response of the output-side steering actuator according to an input value of the output-side steering motor in a frequency domain, and compare an analysis result with preset normal data to diagnose a steering system.

In addition, the steering system according to the present embodiments may include a steering device 100 including an input-side mechanism connected to a steering wheel and an output-side mechanism mechanically separated from the input-side mechanism and connected to the wheel, and a steering assist device 200 including an input-side steering actuator 230-1 for assisting the input-side mechanism connected to a steering wheel, an output-side steering actuator 230-2 which is mechanically separated from the input-side mechanism and assists the output-side mechanism connected to a wheel, an input-side steering controller 220-1 for controlling an input-side steering motor included in the input-side steering actuator, and an output-side steering controller 220-2 for controlling an output-side steering motor included in the output-side steering actuator. The input-side steering controller 220-1 may determine whether of performing a ground checking based on vehicle state information, and determine an input value of the output-side steering motor based on the determination. In addition, if the input-side steering controller determines to perform the ground checking, the output-side steering controller 220-2 may analyze a response of the output-side steering actuator according to an input value of the output-side steering motor in a frequency domain, and compare an analysis result with preset normal data to diagnose a steering system.

Here, the input-side steering controller 220-1 may perform at least one of a ground check determination, a system initiation determination, a synchronization check determination, a steering assist initiation determination, data collection control, notification control, and input-side steering motor control.

Here, the output-side steering controller 220-2 may perform at least one of a steering system diagnosis in ground checking, an alignment state diagnosis of a steering wheel and an output-side mechanism in a synchronization checking, and control of an output-side steering motor.

Since the above-described functions have been described above, they will be omitted below for the sake of simplification of description.

Figure 9:
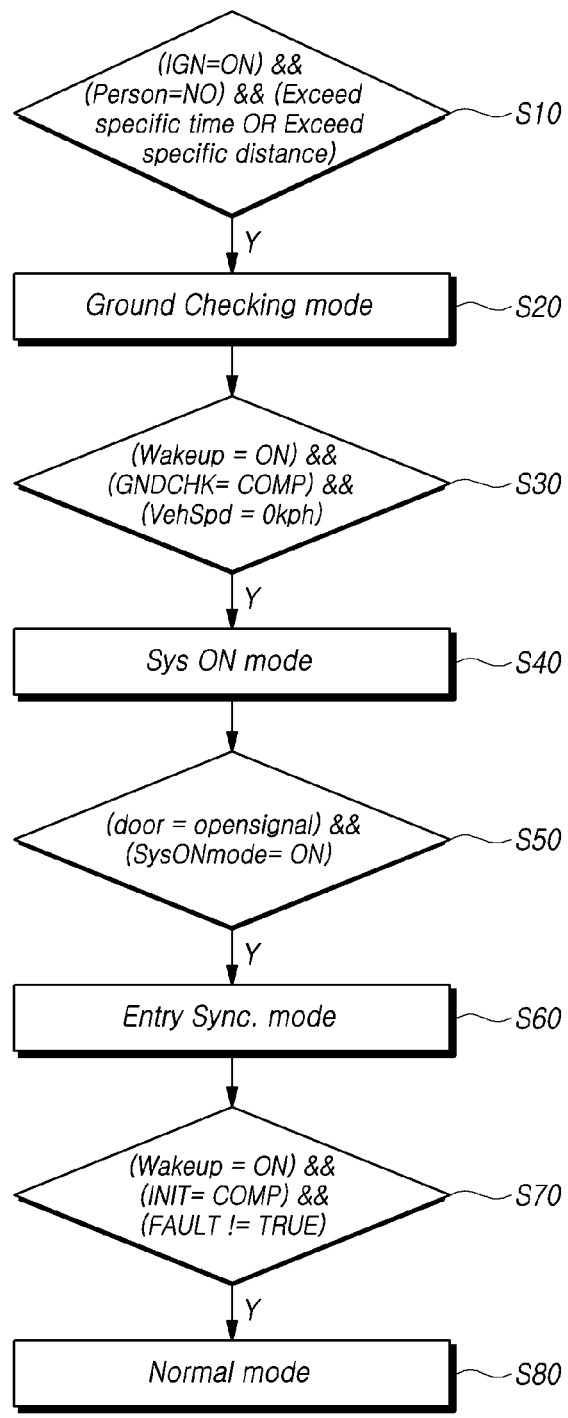
FIGS. 9 to 10 are diagrams for explaining a diagnosis method of a steer-by-wire (SbW) system.
Figure 10:
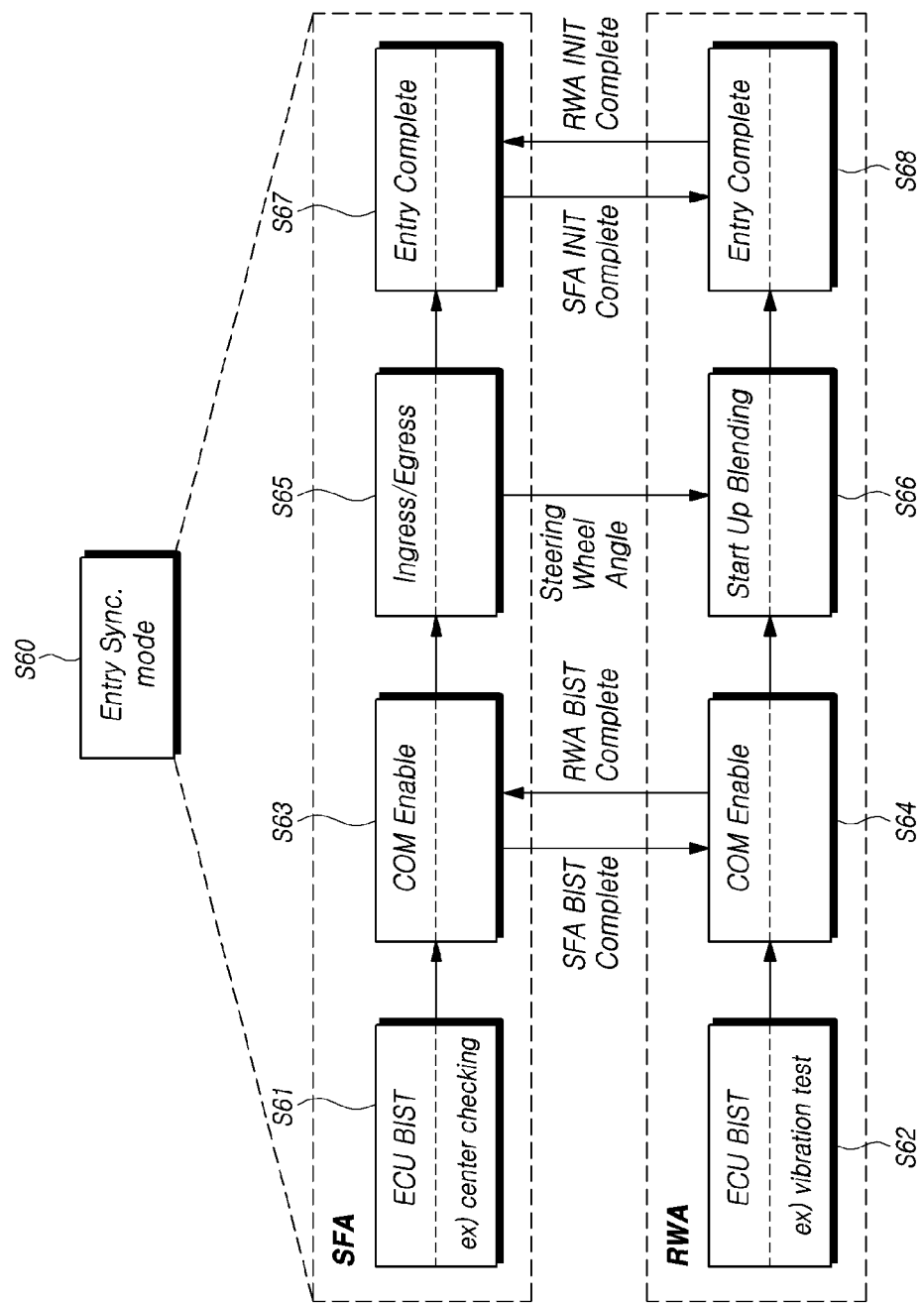

FIGS. 9 to 10 are diagrams for explaining a diagnosis method of a steer-by-wire (SbW) system.

Referring to FIG. 9, first, when the vehicle ignition is OFF and there is no person inside the vehicle, in the case of a state in which the vehicle driving time exceeds the specific time or a state in which the vehicle driving distance exceeds the specific distance (S10), there may enter a ground checking mode (S20).

Here, in the ground checking mode, if the vehicle driving time exceeds a specific time or the vehicle driving distance exceeds a specific distance, the state of the steering system may be checked.

Thereafter, if the vehicle ignition is ON, that is, the wakeup signal is ON, and the vehicle is stopped, that is, the vehicle speed is 0 km/h and the ground checking is completed (S30), there may enter a system ON mode, which is determined to initiate the system (S40).

Here, in the system ON mode, after completing the state check of the steering system, the ECU may be turned on to test the initialization state of the steering system.

Thereafter, if the vehicle driver's seat door open signal is generated, that is, the driver's seat door open signal is in the ON state, and the system is initiate, that is, the ECU is in the ON state (S50), there may enter a synchronization checking mode for determining whether to check synchronization (S60).

Here, in the synchronization checking mode, it is possible to align the position of the steering wheel and the position of the rack of the output-side mechanism.

Thereafter, if the vehicle ignition is ON, that is, the wakeup signal is ON, the synchronization is completed, that is, the position of the steering wheel and the position of the rack of the output-side mechanism are the same, and the steering system is not in a fault state, that is, the signals of the steering system are normal (S70), there may enter a normal mode by determining whether to initiate steering assist (S80).

In the normal mode, diagnosis and initialization of the steering system are completed, so that steering can be normally assisted.

Referring to FIG. 10, an input-side steering assist device may be referred to as a steering feedback actuator (SFA), and an output-side steering assist device may be referred to as a road wheel actuator (RWA).

In the synchronization checking mode (S60), it is possible to diagnose SFA and RWA.

First, the ECU of SFA and ECU of RWA can perform a built-in self-test (BIST) (S61, S62) Here, ECU of SFA may perform a center checking, and ECU of RWA may perform a vibration test.

Thereafter, the ECU of the SFA and the ECU of the RWA may exchange information indicating that the BIST has been completed (S63, S64).

Thereafter, the ECU of the SFA may perform an ingress/egress mode (S65). That is, the ECU of the SFA may measure the driver's seat door open signal and assist so that the steering wheel does not move. Then, ECU of SFA may provide a plurality of information to ECU of RWA. Here, the a plurality of information may include steering angle information of the steering wheel.

Thereafter, the ECU of the RWA may perform a start-up blending operation based on the plurality of information (S66). That is, the ECU of RWA diagnoses the alignment state of the steering wheel and the output-side mechanism based on the steering angle information of the steering wheel and the displacement information of the output-side mechanism, and based on this, may perform a synchronization to align the position of the steering wheel and the position of the output-side mechanism to the same position.

Thereafter, the ECU of the SFA and the ECU of the RWA may exchange information indicating that initialization, that is, synchronization is completed (S67, S68).

As described above, the steering control device, the steering assist device, and the steering system according to the present embodiments may determine whether to enter for each of ground checking mode, system ON mode, synchronization checking mode, and steering assist start mode (i.e., normal mode), and based on this, may assist steering by diagnosing and synchronizing the steering system. Accordingly, it is possible to not only improve the usability during steering system operation, but also to make systematic and accurate diagnosis possible, and to quantify the vehicle state (vibration, noise) felt by the driver feels even if the vehicle's warning light and warning sound are not activated. In addition, it is possible to minimize the cost and time required for diagnosing the steering system during vehicle maintenance, and it is possible to measure vibration and noise caused by mechanical abnormalities in the vehicle with the ignition turned on, reduce maintenance costs, and quantify vibration and noise.

Hereinafter, it will be described a steering assist method according to the present embodiments with reference to the accompanying drawings. The steering assist method according to the present embodiments may be performed through a steering device, a steering assist device, and a steering system. Accordingly, descriptions overlapping with the steering device, the steering assist device, and the steering system according to the present embodiments described above with reference to FIGS. 1 to 10 will be omitted below for simplification of description.

Figure 11:
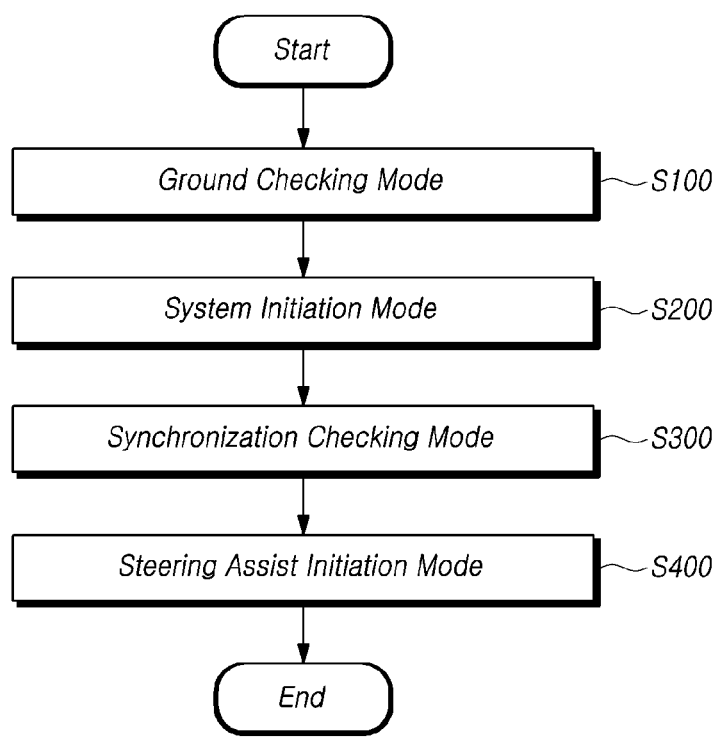
FIGS. 11 to 13 are flowcharts for explaining a steering assist method according to the present embodiments.
Figure 12:
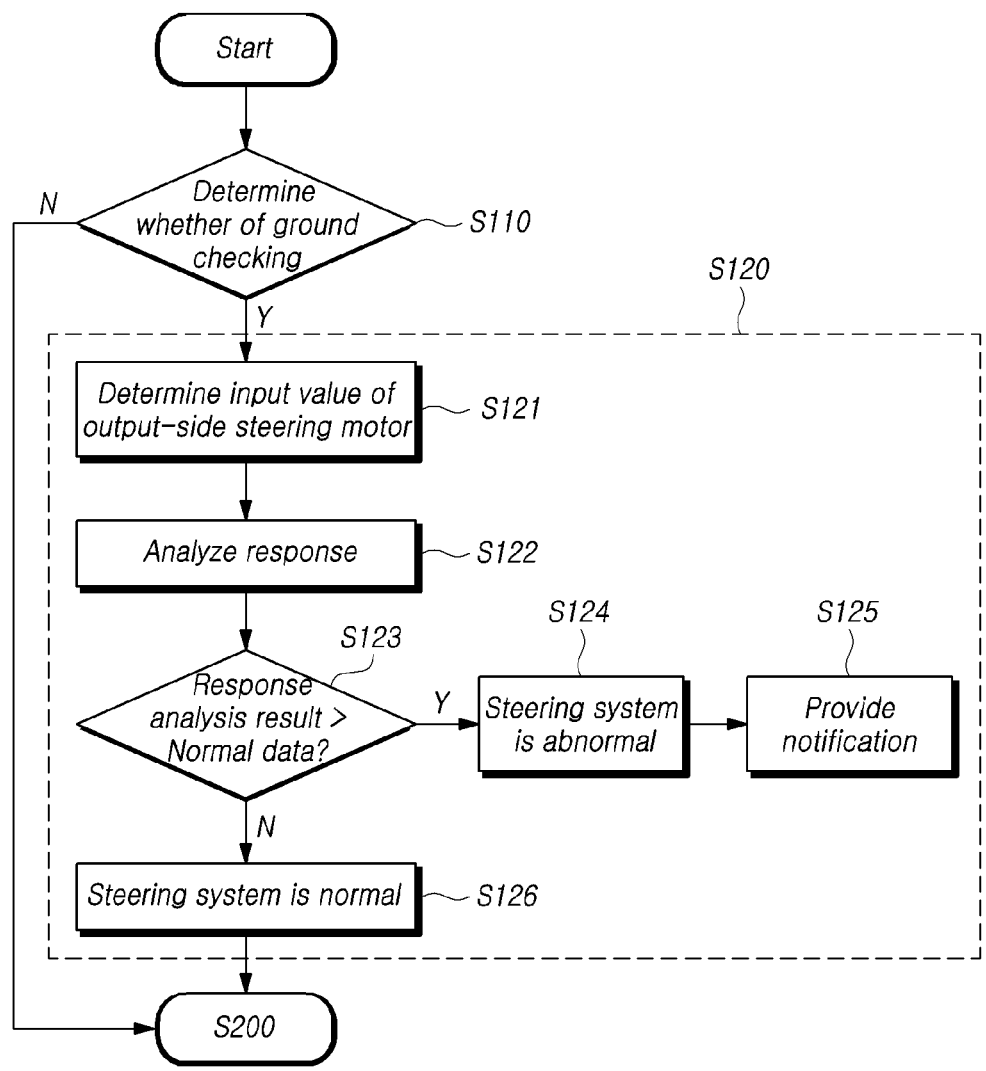
Figure 13:
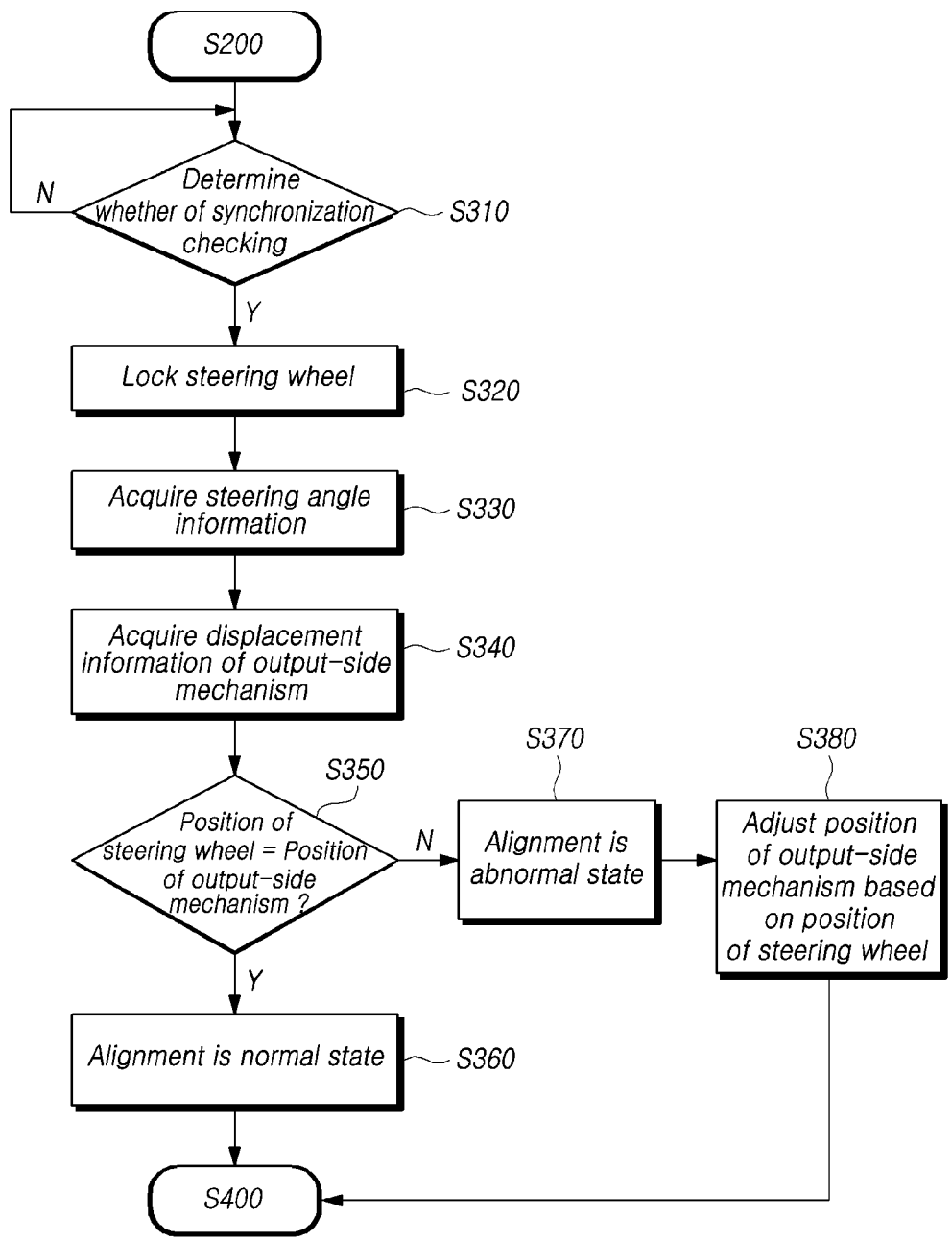

FIGS. 11 to 13 are flowcharts for explaining a steering assist method according to the present embodiments.

Referring to FIG. 11, the steering assist method according to the present embodiments may include at least one of a ground checking mode step S100, a system initiation mode step S200, a synchronization checking mode step S300, and a steering assist initiation mode S400.

First, the ground checking mode may be performed (S100).

That is, the steering assist method according to the present embodiments may control an input-side steering motor included in an input-side steering actuator to assist an input-side mechanism connected to the steering wheel, and may control an output-side steering motor included in an output-side steering actuator to assist the input-side mechanism mechanically separated from the input-side mechanism and connected to the wheel. The steering assist method may include determining whether of performing a ground checking based on vehicle state information, and diagnosing a steering system, in the case of determining to perform the ground checking, by analyzing a response of the output-side steering actuator according to an input value of the output-side steering motor in a frequency domain, and comparing an analysis result with preset normal data.

Referring to FIG. 12, first, there may be determined whether or not to perform ground checking based on vehicle state information (S110).

For example, there may be determined whether of performing the ground checking by determining an ON state or an OFF state of a vehicle ignition based on vehicle ignition information, determining a presence of a person inside a vehicle based on vehicle interior object information, determining a state in which a vehicle driving time exceeds a specific time based on vehicle driving time information, and determining a state in which a vehicle driving distance exceeds a specific distance based on vehicle driving distance information.

That is, there may be determined to perform the ground checking, when the vehicle ignition is OFF and there is no person inside the vehicle, in the case of at least one of a state in which the vehicle driving time exceeds the specific time and a state in which the vehicle driving distance exceeds the specific distance (S110—Y).

In addition, there may be determined not to perform the ground checking in at least one of a state in which the vehicle ignition is ON, a state in which there is a person inside the vehicle, a state in which the vehicle driving time is less than or equal to the specific time, and a state in which the vehicle driving distance is less than or equal to the specific distance (S110—N).

Then, in step S120, in the case of determining to perform the ground checking, there may determine an input value of the output-side steering motor (S121), analyze a response of the output-side steering actuator according to an input value of the output-side steering motor in a frequency domain (S122), and diagnose the steering system by comparing an analysis result with preset normal data (S123).

In an example, there may compare preset normal data with at least one of a gain margin and a phase margin analyzed through a transfer function based on an output value of the output-side steering motor according to a sine input value of the output-side steering motor, and diagnose the steering system according to a comparison result.

That is, the gain margin may be compared with a normal gain margin of preset normal data and the phase margin may be compared with a normal phase margin of preset normal data.

In addition, there may diagnose that the steering system is in an abnormal state in the case of at least one of a case in which the gain margin exceeds the normal gain margin of preset normal data and a case in which the phase margin exceeds the normal phase margin of preset normal data (S214). Then, there may provide a notification that the steering system is in an abnormal state (S125).

In addition, there may diagnose that the steering system is in a normal state if the gain margin is less than or equal to the normal gain margin of the preset normal data and the phase margin is less than or equal to the normal phase margin of the preset normal data (S126).

In another example, there may compare at least one of an amplitude and a frequency of a signal measured by an accelerometer or a vibration sensor with preset normal data when the output-side steering actuator is driven based on a sine input value of the output-side steering motor, and diagnose the steering system according to a comparison result.

That is, the amplitude may be compared with a normal amplitude of preset normal data and the frequency may be compared with a normal frequency of preset normal data.

In addition, there may diagnose that the steering system is in an abnormal state in the case of at least one of a case in which the amplitude exceeds the normal amplitude of preset normal data and a case in which the frequency exceeds the normal frequency of preset normal data.

Furthermore, there may diagnose that the steering system is in a normal state if the amplitude is less than or equal to the normal amplitude of the preset normal data and the frequency is less than or equal to the normal frequency of the preset normal data.

Referring to FIG. 11, thereafter, there may perform the system initiation mode (S200).

That is, there may determine whether to initiate a system (system initiation) based on the vehicle state information.

For example, there may determine whether of system initiation by determining an ON state or an OFF state of a vehicle ignition based on vehicle ignition information, determining a vehicle stop state based on vehicle speed information, and determining a ground checking state based on ground checking information.

That is, there may determine to initiate the system if the vehicle ignition is in the ON state, a vehicle is in the vehicle stop state, and the ground checking is completed.

In addition, there may determine not to initiate the system in the case of at least one of a state in which the vehicle ignition is ON, a state in which a vehicle is not in the vehicle stop state, and a state in which the ground checking is not completed.

Thereafter, there may be performed the synchronization checking mode (S300).

Referring to FIG. 13, first, there may be determined whether to perform synchronization checking based on vehicle state information (S310).

That is, if the driver's seat door open signal is generated and a system is in the system initiation state, there may be determined to perform the synchronization checking (S310—Y).

In addition, there may be determined not to perform the synchronization checking in the case of at least one of a state in which the driver's seat door open signal is not generated, and a state in which a system is not initiated (S310—N).

Thereafter, in the case of determining to perform the synchronization checking, there may assist the steering wheel not to move (S320), acquire the steering angle information of the steering wheel (S330), acquire the displacement information of the output-side mechanism (S340), diagnose an alignment state of the steering wheel and the output-side mechanism based on steering angle information of the steering wheel and displacement information of the output-side mechanism (S350).

For example, there may be diagnosed the alignment state of the steering wheel and the output-side mechanism by determining the position of the steering wheel based on steering angle information of the steering wheel and determining the position of the output-side mechanism based on the displacement information of the output-side mechanism.

That is, there may be diagnosed that the alignment state of the steering wheel and the output-side mechanism is in a normal state (S360) if a position of the steering wheel and a position of the output-side mechanism are in the same position (S350—Y).

Meanwhile, there may be diagnosed that the alignment state of the steering wheel and the output-side mechanism is in an abnormal state if a position of the steering wheel and a position of the output-side mechanism are not in the same position (S370). Then, the operation of the output-side steering motor may be controlled so that the position of the output-side mechanism coincides with the position of the steering wheel (S380).

Referring to FIG. 11, thereafter, there may be performed the steering assist initiation mode (S400).

That is, there may be determined whether to initiate the steering assist based on vehicle state information.

For example, there may determine whether to initiate a steering assist by determining an ON state or an OFF state of a vehicle ignition based on vehicle ignition information, determining a synchronization checking state based on synchronization checking information, and determining a fault state of the steering system based on fault information.

That is, there may determine to initiate the steering assist if the vehicle ignition is in the ON state, a synchronization is completed, and the steering system is not in the fault state.

In addition, there may determine not to initiate the steering assist in the case of at least one of a state in which the vehicle ignition is in the OFF state, a state in which a synchronization is not completed, and a state in which the steering system is in the fault state.

Figure 14:
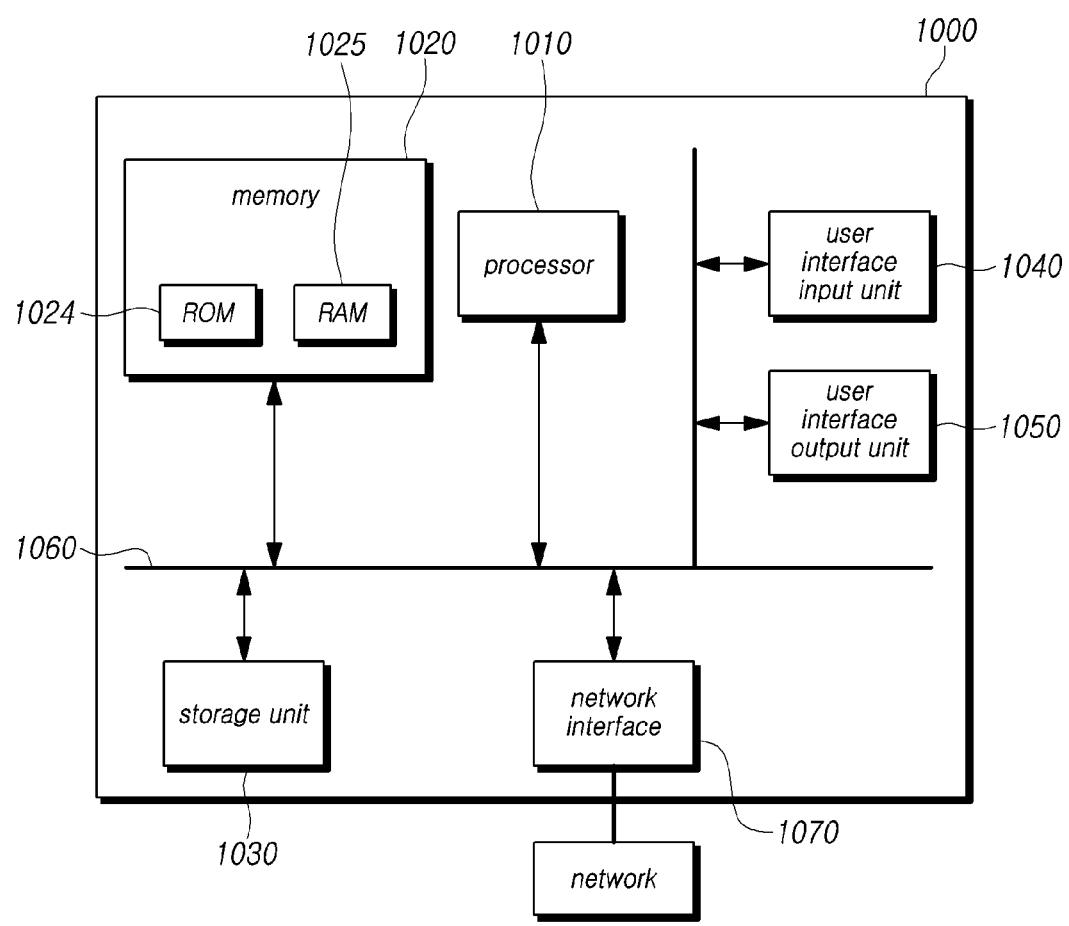
FIG. 14 is a block diagram of a computer system for the steering control device, the steering assist device, and the steering system according to the present embodiments.

FIG. 14 is a block diagram of a computer system for the steering control device, the steering assist device, and the steering system according to the present embodiments.

Referring to FIG. 14, the embodiments described above may be implemented in a computer system, for example, as a computer-readable recording medium. As shown in the FIG. 14, a computer system 1000 such as a steering control device, a steering assist device, and a steering system may include at least one element of one or more processors 1010, a memory 1020, a storage unit 1030, a user interface input unit 1040, and a user interface output unit 1050. These elements may communicate with each other via the bus 1060. Further, the computer system 1000 may also include a network interface 1070 for connecting to a network. The processor 1010 may be a CPU or a semiconductor device for executing processing instructions stored in the memory 1020 and/or the storage 1030. The memory 1020 and the storage unit 1030 may include various types of volatile/nonvolatile storage media. For example, the memory may include ROM 1024 and RAM 1025.

Accordingly, the present embodiments may be implemented as a computer-implemented method or a non-volatile computer recording medium having computer-executable instructions stored therein. The instructions, when executed by a processor, may perform the method according to at least one embodiment of the present embodiments. In particular, if there are a plurality of cores, at least one of the plurality of cores may include a lockstep core.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device, which controls an input-side steering motor included in an input-side steering actuator to assist an input-side mechanism connected to a steering wheel and controls an output-side steering motor included in the output-side steering actuator to assist an output-side mechanism mechanically separated from the input-side mechanism and connected to a wheel, comprising:
 a determiner configuring to determine whether of performing a ground checking based on vehicle state information; and
 a diagnostic controller configuring to, if the determiner determines to perform the ground checking, analyze a response of the output-side steering actuator according to an input value of the output-side steering motor in a frequency domain, and compares an analysis result with preset normal data to diagnose a steering system,
 wherein the diagnostic controller is configured to compare the preset normal data with at least one of a gain margin and a phase margin analyzed through a transfer function based on an output value of the output-side steering motor according to a sine input value of the output-side steering motor, and diagnose the steering system according to a comparison result.

2. The steering control device of claim 1, wherein the determiner is configured to determine whether of performing the ground checking by determining an ON state or an OFF state of a vehicle ignition based on vehicle ignition information, determining a presence of a person inside a vehicle based on vehicle interior object information, determining a state in which a vehicle driving time exceeds a specific time based on vehicle driving time information, and determining a state in which a vehicle driving distance exceeds a specific distance based on vehicle driving distance information.

3. The steering control device of claim 2, wherein the determiner is configured to determine to perform the ground checking, when the vehicle ignition is OFF and there is no person inside the vehicle, in the case of at least one of the state in which the vehicle driving time exceeds the specific time and the state in which the vehicle driving distance exceeds the specific distance.

4. The steering control device of claim 1, wherein the diagnostic controller is configured to compare the gain margin with a normal gain margin of the preset normal data and compares the phase margin with a normal phase margin of the preset normal data,
 wherein the diagnostic controller is configured to diagnose that the steering system is in an abnormal state in the case of at least one of a case in which the gain margin exceeds the normal gain margin of the preset normal data and a case in which the phase margin exceeds the normal phase margin of the preset normal data, and diagnose that the steering system is in a normal state if the gain margin is less than or equal to the normal gain margin of the preset normal data and the phase margin is less than or equal to the normal phase margin of the preset normal data.

5. The steering control device of claim 1, wherein the diagnostic controller is configured to compare at least one of an amplitude and a frequency of a signal measured by an accelerometer or a vibration sensor with the preset normal data when the output-side steering actuator is driven based on a sine input value of the output-side steering motor, and diagnose the steering system according to a comparison result.

6. The steering control device of claim 5, wherein the diagnostic controller is configured to compare the amplitude with a normal amplitude of the preset normal data and compare the frequency with a normal frequency of the preset normal data,
 wherein the diagnostic controller is configured to diagnose that the steering system is in an abnormal state in the case of at least one of a case in which the amplitude exceeds the normal amplitude of the preset normal data and a case in which the frequency exceeds the normal frequency of the preset normal data, and diagnose that the steering system is in a normal state if the amplitude is less than or equal to the normal amplitude of the preset normal data and the frequency is less than or equal to the normal frequency of the preset normal data.

7. The steering control device of claim 1, wherein the determiner is configured to determine whether of system initiation by determining an ON state or an OFF state of a vehicle ignition based on vehicle ignition information, determining a vehicle stop state based on vehicle speed information, and determining a ground checking state based on ground checking information,
 wherein the determiner is configured to determine to initiate the steering system if the vehicle ignition is in the ON state, a vehicle is in the vehicle stop state, and the ground checking is completed.

8. The steering control device of claim 1, wherein the determiner is configured to determine whether of performing a synchronization checking by determining a driver's seat door open signal generation state of a vehicle based on vehicle driver's seat door information, and determining a system initiation state based on system initiation information,
 wherein the determiner is configured to determine to perform the synchronization checking if the driver's seat door open signal is generated and a system is in the system initiation state.

9. The steering control device of claim 8, wherein, if the determiner determines to perform the synchronization checking, the diagnostic controller is configured to diagnose an alignment state of the steering wheel and the output-side mechanism based on steering angle information of the steering wheel and displacement information of the output-side mechanism in a state where the steering wheel is assisted not to move.

10. The steering control device of claim 9, wherein the diagnostic controller is configured to diagnose that the alignment state of the steering wheel and the output-side mechanism is abnormal if a position of the steering wheel and a position of the output-side mechanism are not in the same position.

11. The steering control device of claim 1, wherein the determiner is configured to determine whether to initiate a steering assist by determining an ON state or an OFF state of a vehicle ignition based on vehicle ignition information, determining a synchronization checking state based on synchronization checking information, and determining a fault state of the steering system based on fault information,
 wherein the determiner is configured to determine to initiate the steering assist if the vehicle ignition is in the ON state, a synchronization is completed, and the steering system is not in the fault state.

12. A steering assist device comprising:
an input-side steering actuator configured to assist an input-side mechanism connected to a steering wheel;
an output-side steering actuator which is mechanically separated from the input-side mechanism and configured to assist an output-side mechanism connected to a wheel;
an input-side steering controller configured to control an input-side steering motor included in the input-side steering actuator; and
an output-side steering controller configured to control an output-side steering motor included in the output-side steering actuator,
wherein the input-side steering controller is configured to determine whether of performing a ground checking based on vehicle state information, and determine an input value of the output-side steering motor based on the determination,
wherein, if the input-side steering controller is configured to determine to perform the ground checking, the output-side steering controller is configured to analyze a response of the output-side steering actuator according to an input value of the output-side steering motor in a frequency domain, and compare an analysis result with preset normal data to diagnose a steering system,
wherein the input-side steering controller is configured to:
determine whether of performing the ground checking by determining an ON state or an OFF state of a vehicle ignition based on vehicle ignition information, determining a presence of a person inside a vehicle based on vehicle interior object information, determining a state in which a vehicle driving time exceeds a specific time based on vehicle driving time information, and determining a state in which a vehicle driving distance exceeds a specific distance based on vehicle driving distance information; or
determine whether of system initiation by determining the ON state or the OFF state of the vehicle ignition based on the vehicle ignition information, determining a vehicle stop state based on vehicle speed information, and determining a ground checking state based on ground checking information; or
determine whether of performing a synchronization checking by determining a driver's seat door open signal generation state of the vehicle based on vehicle driver's seat door information, and determining a system initiation state based on system initiation information; or
determine whether to initiate a steering assist by determining the ON state or the OFF state of the vehicle ignition based on the vehicle ignition information, determining a synchronization checking state based on synchronization checking information, and determining a fault state of the steering system based on fault information.

13. The steering assist device of claim 12, wherein the output-side steering controller is configured to compare the preset normal data with at least one of a gain margin and a phase margin analyzed through a transfer function based on an output value of the output-side steering motor according to a sine input value of the output-side steering motor, and diagnose the steering system according to a comparison result.

14. The steering assist device of claim 12, wherein the output-side steering controller is configured to compare at least one of an amplitude and a frequency of a signal measured by an accelerometer or a vibration sensor with the preset normal data when the output-side steering actuator is driven based on a sine input value of the output-side steering motor, and diagnose the steering system according to a comparison result.

15. The steering assist device of claim 12,
wherein the input-side steering controller is configured to determine to initiate the steering system if the vehicle ignition is in the ON state, a vehicle is in the vehicle stop state, and the ground checking is completed.

16. The steering assist device of claim 12,
wherein the input-side steering controller is configured to determine to perform the synchronization checking if the driver's seat door open signal is generated and a system is in the system initiation state.

17. The steering assist device of claim 12,
wherein the input-side steering controller is configured to determine to initiate the steering assist if the vehicle ignition is in the ON state, a synchronization is complete, and the steering system is not in the fault state.

18. A steering assist method for controlling an input-side steering motor included in a input-side steering actuator to assist an input-side mechanism connected to a steering wheel and controlling an output-side steering motor included in a output-side steering actuator to assist an output-side mechanism mechanically separated from the input-side mechanism and connected to a wheel comprising:
determining whether of performing a ground checking based on vehicle state information; and
diagnosing a steering system, in the case of determining to perform the ground checking, by analyzing a response of the output-side steering actuator according to an input value of the output-side steering motor in a frequency domain, and comparing an analysis result with preset normal data,
wherein the diagnosing comprises:
comparing the preset normal data with at least one of a gain margin and a phase margin analyzed through a transfer function based on an output value of the output-side steering motor according to a sine input value of the output-side steering motor; and
diagnosing the steering system according to a comparison result.

* * * * *